No. 840,555. PATENTED JAN. 8, 1907.
C. R. BUFFINGTON.
SHEEP HOOK.
APPLICATION FILED AUG. 13, 1906.

WITNESSES:   Charles R. Buffington, INVENTOR
By C. A. Snow & Co.
ATTORNEYS

THE NORRIS PETERS CO., WASHINGTON, D. C.

UNITED STATES PATENT OFFICE.

CHARLES R. BUFFINGTON, OF SACO, MONTANA.

SHEEP-HOOK.

No. 840,555.  Specification of Letters Patent.  Patented Jan. 8, 1907.

Application filed August 13, 1906. Serial No. 330,394.

*To all whom it may concern:*

Be it known that I, CHARLES R. BUFFINGTON, a citizen of the United States, residing at Saco, in the county of Valley and State of Montana, have invented a new and useful Sheep-Hook, of which the following is a specification.

This invention relates to sheep-hooks, and has for its object to provide a comparatively simple and inexpensive device of this character for catching and holding sheep, hogs, and other animals.

A further object of the invention is to provide a hook including a pair of spaced diverging arms to one of which is attached a spring-latch or keeper adapted to form a closure for one end of the hook, thereby to prevent the escape of the animal, and means for moving the latch to open or inoperative position to release the animal.

A further object of the invention is to generally improve this class of devices so as to increase their utility, durability, and efficiency, as well as to reduce the cost of manufacture.

With these and other objects in view the invention consists in the construction and novel combination and arrangement of parts hereinafter fully described, and illustrated in the accompanying drawings, it being understood that various changes in form, proportions, and minor details of construction may be resorted to within the scope of the appended claims.

Figure 1:
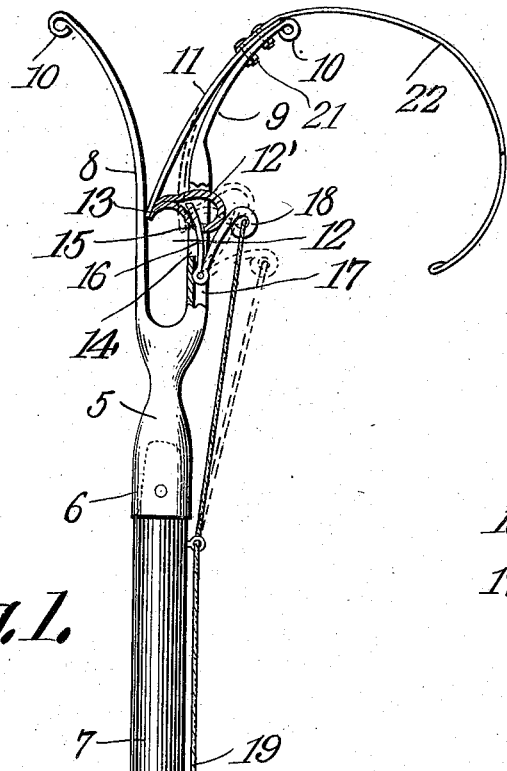
Figure 2:
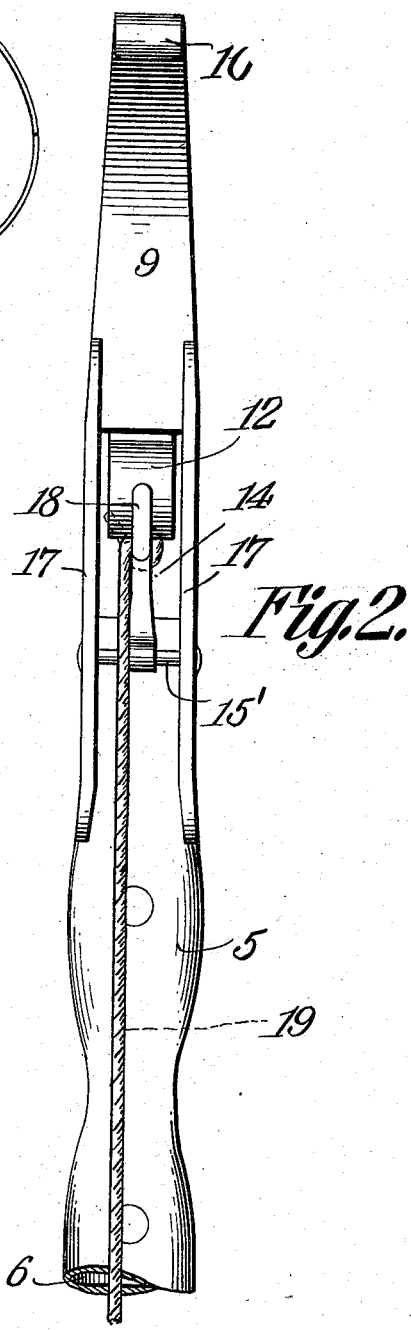

In the accompanying drawings, forming a part of this specification, Figure 1 is a side elevation, partly in section, of a sheep-hook constructed in accordance with my invention. Fig. 2 is a side elevation with the spring-hook detached.

Similar numerals of reference indicate corresponding parts in both of the figures of the drawings.

The improved device consists of a body portion 5, having a socket 6 formed in one end thereof for the reception of a staff or handle 7 and having its opposite or free end bifurcated to form a pair of spaced arms 8 and 9, the ends of which are curved laterally and bent upon themselves to form terminal loops 10 to prevent cutting or otherwise injuring the leg of the animal.

Secured to the free end of the arm 9 is a spring-latch 11, the free end of which forms a closure for the leg-receiving opening 12 of the body portion, as shown. Extending laterally from the free end of the latch 11 is a loop 12′, having one wall thereof curved laterally at 13 to conform to the curvature of the adjacent wall of the leg-receiving opening 12. The loop 12′ extends through a slot 14 in the arm 9 and is provided with an opening 15 for the reception of the angular arm 16 of a pivoted trigger. The trigger is pivotally mounted on a pin or rod 15′, secured to the lateral reinforcing-flanges 17 of the arm 9, and is formed with a loop 18, to which is secured one end of an operating-cord 19, terminating in a suitable handle 20.

Detachably secured to one of the diverging arms of the body portion, as by bolts, screws, or similar fastening devices 21, is a spring-hook 22 for the purpose of catching young lambs by the neck, so that the animals may be conveniently handled without danger of injuring the same. If desired, however, the spring-hook may be detached by removing the bolts 21 and the tool used without said hook.

In operation the tool is forced laterally against the leg of the sheep or other animal, which depresses the latch 11, thereby forcing the curved wall of the opening 12 in engagement with the leg of the animal, the latch 11 automatically returning to normal position, and thus preventing the escape of the animal. In order to release the animal, it is merely necessary to exert a longitudinal pull on the operating-handle 20, which causes the angular arms of the trigger to move the latch or locking member laterally to open position, thereby releasing the animal, as best shown in Fig. 1 of the drawings.

From the foregoing description it will be seen that there is provided an extremely simple, inexpensive, and efficient device admirably adapted for the attainment of the ends in view.

Having thus described the invention, what is claimed is—

1. A sheep-hook provided with spaced arms defining a leg-receiving opening, a spring locking member extending across said opening, and a trigger associated with the locking member for moving the latter to released position.

2. A sheep-hook provided with spaced arms defining a leg-receiving opening, one of said arms being provided with a slot, a spring-latch secured to the slotted arm and extending across the opening, a loop projecting laterally from the free end of the latch, and a trigger associated with the loop for moving the latch to released position.

3. A sheep-hook having a pair of spaced arms defining a leg-receiving opening, a latch extending across said opening, a trigger pivotally mounted on one of the arms for moving the latch to released position, and means for operating the trigger to release the latch.

4. A sheep-hook including a pair of spaced arms one of which is slotted and provided with reinforcing-flanges, a spring-latch secured to one of said arms and engaging the opposite arm, a loop extending laterally from the free end of the latch, a pin connecting the reinforcing-flanges, and a trigger pivotally mounted on the pin and operatively connected with the loop for moving the latch to released position.

5. A sheep-hook including spaced arms one of which is provided with an elongated slot, a spring-latch secured to one of the arms and bearing against the adjacent arm, a loop extending laterally from the free end of the latch and projecting through the slot in the arm, said loop being provided with an opening, and a trigger having angularly-disposed arms one of which is seated in the opening in the loop and its opposite arm operatively connected with the operating-cord for moving the latch to released position.

6. A sheep-hook comprising a pair of diverging arms, a locking member extending transversely across said arms and movable laterally to released position, one of said arms being provided with a spring-hook, and a trigger coöperating with the locking member for moving the latter to released position.

7. A sheep-hook comprising a pair of diverging arms, a spring locking member extending transversely across said arms, means for moving the locking member to released position, and a spring-hook detachably secured to one of said arms and having its free end bent downwardly and spaced from said arm.

In testimony that I claim the foregoing as my own I have hereto affixed my signature in the presence of two witnesses.

CHAS. R. BUFFINGTON.

Witnesses:
HARRY A. VAGG,
JOHN K. BELL.